Sept. 6, 1932.  E. J. HADLEY  1,876,413

FRAMING MEANS FOR MOTION PICTURE PROJECTORS

Filed Sept. 29, 1931

INVENTOR
Edwin J Hadley,
BY
George D. Richards
ATTORNEY

Patented Sept. 6, 1932

1,876,413

UNITED STATES PATENT OFFICE

EDWIN J. HADLEY, OF BROOKLYN, NEW YORK

FRAMING MEANS FOR MOTION PICTURE PROJECTORS

Application filed September 29, 1931. Serial No. 565,725.

This invention relates to improvements in framing means for motion picture projectors; and has for its principal object to provide means, in combination with motion picture film driving mechanism, for framing the individual picture sections of the driven film in proper registration with the aperture of the gate through which the picture sections are illuminated and projected.

This invention has for a further object to provide a novel and simple manipulatable means for adjusting the driven film, without interfering with its progressive driven movement through the projecting gate, so as to quickly and easily bring its individual picture sections into proper registration with the aperture of said gate.

Other objects of this invention, not at this time more particularly enumerated, will be understood from the following detailed description of the same.

Illustrative embodiments of this invention are shown in the accompanying drawing, in which:—

Similar characters of reference are employed in the above described views, to indicate corresponding parts.

Figure 1:
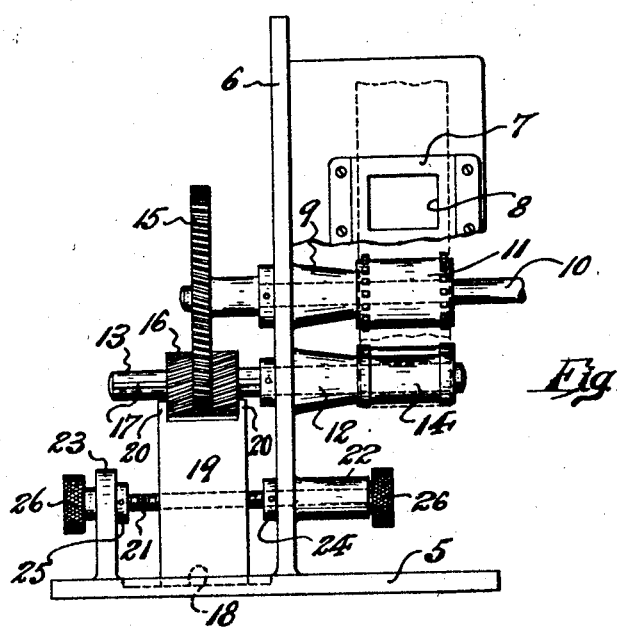
Fig. 1 is a fragmentary front elevation of a motion picture projector equipped with the novel framing means of this invention.

Referring to the drawing, the reference character 5 indicates the base of an upstanding carrier plate 6 upon which certain elements of the film driving mechanism are mounted. Also supported in connection with said carrier plate 6, or in any other suitable manner, is a gate 7 having an aperture 8 across which the driven film is progressively moved by the driving mechanism, and through which the illuminated images of the film section are projected.

Journaled in a bearing member 9 provided in connection with said carrier plate 6 is a drive shaft 10, which may in turn be driven from any suitable source of power, as e. g. an electric motor (not shown). Fixed on said shaft 10 is a film driving sprocket 11, which engages the perforate margins of a film so as to impart motion to the latter in the usual manner.

Journaled in a bearing member 12 also provided in connection with said carrier plate 6 is a counter shaft 13, to which rotation is imparted from said drive shaft 10 by transmission mechanism to be hereafter more fully described. Fixed on and driven by said counter shaft 13 is a retarding cam 14 over which the film moves, and rotation of which causes the driven film to advance relative to the gate aperture 8 with a substantially intermittent movement producing a retardation or dwell of each picture section at the aperture 8. Said counter shaft 13 is so located as to position said retarding cam 14 below the gate 7, and intermediate the latter and said film driving sprocket 11. Said retarding cam 14 is of the general type and kind disclosed in my prior United States Patent No. 1,334,450, dated March 23, 1920.

I have found that by advancing or delaying the effective moment in the periodicity of the rotated retarding cam, and while the film is being driven by the continuously rotating driving sprocket 11, that the individual picture sections may be quickly and easily shifted into registration or "frame" with the aperture 8 of the gate 7 across which the picture sections are being moved; I have, therefore, in the present invention provided a novel manipulatable means for altering the position of the retarding cam to advance or delay the effective moment of its periodicity without interfering with or disconnecting the transmission mechanism by which said retarding cam and the counter shaft carrying the same are actuated from the drive shaft 10, and consequently without necessity of stopping the machine or interrupting the operative running movement of the film therethrough. To this end, there is fixed on the drive shaft 10 a helical gear 15 which meshes with and drives a helical pinion 16 mounted on said counter shaft 13. The helical pinion 16 is connected with said counter shaft 13 by a spline 17, so that the pinion may be shifted longitudinally on the counter shaft 13 in either direction, while remaining in driving relation thereto.

Movably mounted in a channeled guideway 18 provided in the base 5, and aligned with and beneath the counter shaft 13, is a traveler plate 19 having at each side abutment lugs or ears 20 to respectively engage opposite ends of said pinion 16. Threaded through said traveler plate 19 is an adjusting screw 21, the same being rotatably journaled at one end in a bearing member 22 provided in connection with said carrier plate 6, and also preferably supported and rotatably journaled at its opposite end in a bearing post 23 which rises from said base 5. Said adjusting screw 21 is held against longitudinal movement, while being free to rotate, by means of collars 24 and 25 which respectively abut said carrier plate 6 and bearing post 23. Secured on each end of said adjusting screw are finger pieces or knobs 26, by either of which said screw may be manually turned.

Figure 2:
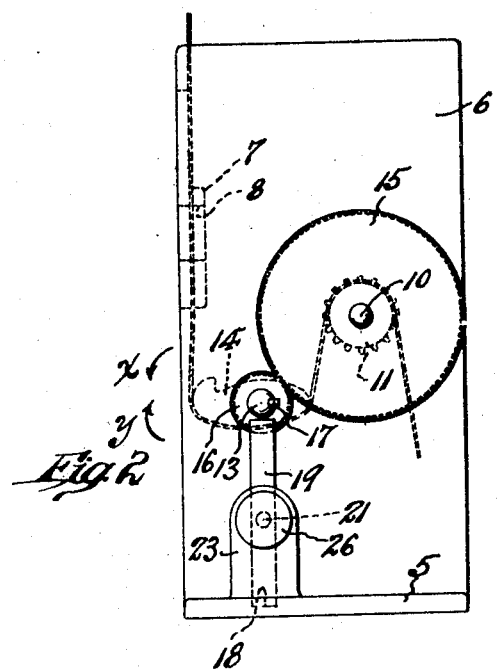
Fig. 2 is a side elevation of the same.

In the operation of the apparatus, by means of either knob 26, the adjusting screw 21 may be turned to cause either an inward or outward travel of the traveler plate 19. The movement of the traveler plate in one direction, e. g. outwardly, shifts the helical pinion 16 outwardly on the counter shaft 13. Owing to the helical shape of the intermeshing teeth of the gear 15 and pinion 16 outward longitudinal movement will rotatably shift the pinion 16, counter shaft 13 and retarding cam 14 in the direction of the arrow $x$ in Fig. 2, whereby the running film is advanced across the aperture 8 to adjust the individual picture sections thereof downwardly relative to the said aperture to cause the same to run in registration therewith. Movement of the traveler plate 19, e. g. inwardly, shifts the pinion 16 inwardly on the counter shaft and against the gear 15 to rotatably shift the pinion 16, counter shaft 13 and retarding cam 14 in the direction of the arrow $y$ in Fig. 2, whereby the running film is caused to lag in movement across the aperture 8 to thus adjust the individual picture sections thereof upwardly relative to and into registration with said aperture. It will therefore be obvious that by such simple manipulations the running film may be readily and quickly adjusted in either direction at will to properly frame the individual picture sections thereof in the aperture 8 of the gate 7; and this without necessity for stopping machine or interfering with the normal operating relation established between the driving sprocket 11 and retarding cam 14 whereby the latter is driven by and from the shaft of the former.

Figure 3:
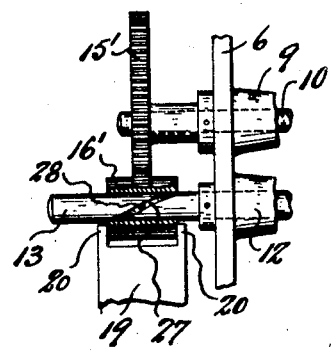
Fig. 3 is a fragmentary view in part section showing a modification of the adjusting elements of the novel framing means.

Referring to Fig. 3, I have shown a modified arrangement for effecting the results above described, wherein, instead of employing the described intermeshing helical gear and pinion 15—16 between the drive shaft 10 and counter-shaft 13, I employ a gear 15' and pinion 16' of the spur type. In such case the counter-shaft 13 is provided with a helical groove 27, and the pinion 16' is provided with an internal pin 28 riding in said groove 27. It will be obvious that shifting of the pinion 16' on the thus modified counter-shaft 13 will through the effect of the cooperating groove 27 and pin 28 produce a rotatable shift of the counter-shaft 13 and its retarding cam 14 in one direction or the other, as the case may be, to thereby produce the desired framing adjustment of the running film relative to the aperture 8 of the gate 7.

As changes, other than those referred to, could be made in the above described construction and many apparently widely different embodiments of this invention could be made without departing from the scope thereof, it is intended that all matter contained in the above description or shown in the accompanying drawing shall be interpreted as illustrative, and not in a limiting sense.

I claim:—

1. In a motion picture projector, a gate having a projection aperture across which a motion picture film is moved, a drive shaft, a film driving sprocket on said drive shaft, a counter-shaft, a film retarding cam on said counter-shaft, a drive gear on said drive shaft, a pinion on said counter shaft to mesh with said drive gear, said pinion being shiftable, while remaining in mesh with said drive gear, longitudinally in either direction on said counter-shaft, manipulatable means for so shifting said pinion, and means for translating longitudinal shifting movements of said pinion into rotatable adjusting movements of said counter-shaft and retarding cam for framing the picture sections of running film in registration with said projection aperture.

2. In a motion picture projector, a gate having a projection aperture across which a motion picture film is moved, a drive shaft, a film driving sprocket on said drive shaft, a counter-shaft, a film retarding cam on said counter-shaft, a drive gear on said drive shaft, a pinion on said counter-shaft to mesh with said drive gear, said pinion being shiftable, while remaining in mesh with said drive gear, longitudinally in either direction on said counter shaft, a movable traveler plate having means to embrace and longitudinally shift said pinion, a manipulatable adjusting screw for moving said traveler plate, and means for translating longitudinal shifting movements of said pinion into rotatable adjusting movements of said counter-shaft and retarding cam for framing the picture sections of running film in registration with said projection aperture.

3. In a motion picture projector, a gate having a projection aperture across which a motion picture film is moved, a drive shaft, a film driving sprocket on said drive shaft, a counter-shaft, a film retarding cam on said counter-shaft, a helical drive gear fixed on said drive shaft, a helical pinion keyed on said counter-shaft to mesh with said helical drive gear, said pinion being shiftable, while remaining in mesh with said drive gear, longitudinally in either direction on said counter shaft to produce rotative shifting adjustment of the driven counter-shaft and retarding cam to effect framing movements of the running film relative to said projection aperture, and manipulatable means for shifting said pinion selectively in either direction.

4. In a motion picture projector, a gate having a projection aperture across which a motion picture film is moved, a drive shaft, a film driving sprocket on said drive shaft, a counter-shaft, a film retarding cam on said counter-shaft, a helical drive gear fixed on said drive shaft, a helical pinion keyed on said counter-shaft to mesh with said helical drive gear, said pinion being shiftable, while remaining in mesh with said drive gear, longitudinally in either direction on said counter shaft to produce rotative shifting adjustment of the driven counter-shaft and retarding cam to effect framing movements of the running film relative to said projection aperture, a movable traveler plate having means to embrace and longitudinally shift said pinion, and a manipulatable adjusting screw for moving said traveler plate selectively at will in either direction to effect corresponding shifting movements of said pinion.

In testimony, that I claim the invention set forth above I have hereunto set my hand this 28th day of September, 1931.

EDWIN J. HADLEY.